US010235689B2

(12) United States Patent
Hertel et al.

(10) Patent No.: US 10,235,689 B2
(45) Date of Patent: Mar. 19, 2019

(54) POINT OF SALE OFFER REDEMPTIONS

(71) Applicant: GOOGLE LLC, Mountain View, CA (US)

(72) Inventors: Philipp Hertel, San Francisco, CA (US); Paul Lee, Palo Alto, CA (US); Sheldon I. Walfish, Palo Alto, CA (US); Alexander W. Hertel, Sunnyvale, CA (US); Steven Viavant, Oakland, CA (US); Dan Moisa, San Francisco, CA (US); Gene Sokolov, Moscow (RU)

(73) Assignee: GOOGLE LLC, Mountain View, CA (US)

( * ) Notice: Subject to any disclaimer, the term of this patent is extended or adjusted under 35 U.S.C. 154(b) by 247 days.

(21) Appl. No.: 14/222,558

(22) Filed: Mar. 21, 2014

(65) Prior Publication Data

US 2014/0207556 A1 Jul. 24, 2014

Related U.S. Application Data

(63) Continuation of application No. 13/467,864, filed on May 9, 2012.

(51) Int. Cl.
*G06Q 30/00* (2012.01)
*G06Q 30/02* (2012.01)
*G05B 19/418* (2006.01)

(52) U.S. Cl.
CPC ......... *G06Q 30/0238* (2013.01); *G06Q 30/02* (2013.01)

(58) Field of Classification Search
None
See application file for complete search history.

(56) References Cited

U.S. PATENT DOCUMENTS 5,185,695 A 2/1993 Pruchnicki
5,237,496 A 8/1993 Kagami et al.
(Continued)

FOREIGN PATENT DOCUMENTS

EP 1 164 529 A1 12/2001
JP 02-155067 A 6/1990
(Continued)

OTHER PUBLICATIONS

"MobiPag: Integrated Mobile Payment, Ticketing and Couponing Solution Based on NFC". Publishing Venue: Sensors (Basel, Switzerland), 14(8), 13389-13415. ISSN: 1424-8220. Electronic Publication Date: Jul. 24, 2014. (Year: 2014)*
(Continued)

*Primary Examiner* — Maria V Vanderhorst
(74) *Attorney, Agent, or Firm* — Johnson, Marcou & Isaacs, LLC

(57) ABSTRACT

Processing of point of sale ("POS") redemptions via a "tap" of a contactless device comprises a POS data collector that facilitates a connection with a contactless device. A merchant scans items for purchase using a POS scanner, which captures product identification information. The POS scanner forwards the product identification information to a POS terminal. The POS data collector intercepts the product identification information between the POS scanner and the POS terminal. A user taps the contactless device in the POS data collector's radio frequency field, and a communication channel is established between the contactless device and the POS data collector. The POS data collector identifies the user via the contactless device and identifies coupons, merchant offers, and other value-added services to redeem with the transaction. The POS data collector forwards this information to the POS terminal, the redemptions are applied to the transaction, and the communication is terminated.

20 Claims, 8 Drawing Sheets

(56) References Cited

U.S. PATENT DOCUMENTS

| | | | |
|---|---|---|---|
| 5,392,328 | A | 2/1995 | Schmidt et al. |
| 5,642,485 | A | 6/1997 | Deaton et al. |
| 5,855,007 | A | 12/1998 | Jovicic et al. |
| 6,029,152 | A | 2/2000 | Bublitz et al. |
| 6,334,108 | B1 | 12/2001 | Deaton et al. |
| 6,377,935 | B1 | 4/2002 | Deaton et al. |
| 6,701,462 | B1 | 3/2004 | Majcher et al. |
| 6,993,498 | B1 | 1/2006 | Deaton et al. |
| 7,097,098 | B2 | 8/2006 | Roberts |
| 7,182,255 | B2 | 2/2007 | Mollett et al. |
| 7,240,027 | B2 | 7/2007 | McConnell et al. |
| 7,337,197 | B2 | 2/2008 | Wilson et al. |
| 7,379,890 | B2 | 5/2008 | Myr et al. |
| 7,685,226 | B1 | 3/2010 | Norton et al. |
| 7,860,789 | B2 | 12/2010 | Hirka et al. |
| 7,890,422 | B1 | 2/2011 | Hirka et al. |
| 8,010,582 | B2 | 8/2011 | Zimowski |
| 8,020,754 | B2 | 9/2011 | Schwarz, Jr. |
| 8,078,496 | B2 | 12/2011 | Postrel |
| 8,332,272 | B2 * | 12/2012 | Fisher ............... H04W 4/21 705/16 |
| 8,335,722 | B2 | 12/2012 | Lee et al. |
| 8,392,261 | B2 | 3/2013 | Lee et al. |
| 8,564,453 | B1 | 10/2013 | Morneau et al. |
| 2001/0049690 | A1 | 12/2001 | McConnell et al. |
| 2002/0029191 | A1 | 3/2002 | Ishibashi et al. |
| 2002/0070976 | A1 | 6/2002 | Tanner et al. |
| 2002/0077907 | A1 | 6/2002 | Ukai et al. |
| 2002/0091569 | A1 | 7/2002 | Kitaura et al. |
| 2002/0091571 | A1 | 7/2002 | Thomas et al. |
| 2002/0111864 | A1 | 8/2002 | Ukai et al. |
| 2002/0128911 | A1 | 9/2002 | Furuta |
| 2002/0138348 | A1 | 9/2002 | Narayan et al. |
| 2002/0147651 | A1 | 10/2002 | Hoar et al. |
| 2002/0160761 | A1 | 10/2002 | Wolfe |
| 2002/0194081 | A1 | 12/2002 | Perkowski |
| 2003/0061157 | A1 | 3/2003 | Hirka et al. |
| 2003/0120546 | A1 | 6/2003 | Cusack et al. |
| 2003/0233276 | A1 | 12/2003 | Pearlman et al. |
| 2004/0128199 | A1 | 7/2004 | Cusack et al. |
| 2004/0140361 | A1 | 7/2004 | Paul et al. |
| 2004/0153459 | A1 | 8/2004 | Whitten et al. |
| 2004/0236700 | A1 | 11/2004 | Beenau et al. |
| 2004/0243478 | A1 | 12/2004 | Walker et al. |
| 2004/0249712 | A1 | 12/2004 | Brown et al. |
| 2005/0021401 | A1 | 1/2005 | Postrel |
| 2005/0065952 | A1 | 3/2005 | Dettinger et al. |
| 2005/0071230 | A1 | 3/2005 | Mankoff |
| 2005/0108304 | A1 | 5/2005 | Wilson et al. |
| 2005/0108523 | A1 | 5/2005 | West |
| 2005/0165651 | A1 | 7/2005 | Mohan |
| 2005/0165817 | A1 | 7/2005 | O'Conor |
| 2005/0187873 | A1 | 8/2005 | Labrou et al. |
| 2005/0222888 | A1 | 10/2005 | Hosoda et al. |
| 2005/0222910 | A1 | 10/2005 | Wills |
| 2005/0234771 | A1 | 10/2005 | Register et al. |
| 2005/0247778 | A1 | 11/2005 | Roberts |
| 2006/0100925 | A1 | 5/2006 | Finaly |
| 2007/0061210 | A1 | 3/2007 | Chen et al. |
| 2007/0067203 | A1 | 3/2007 | Gil et al. |
| 2007/0150328 | A1 | 6/2007 | Koide et al. |
| 2007/0160067 | A1 | 7/2007 | Hayward |
| 2007/0179983 | A1 | 8/2007 | Putman |
| 2008/0029597 | A1 | 2/2008 | Harding et al. |
| 2008/0077515 | A1 | 3/2008 | Zoldi et al. |
| 2008/0140511 | A1 | 6/2008 | Sharma et al. |
| 2008/0147477 | A1 | 6/2008 | McCormick |
| 2008/0179388 | A1 | 7/2008 | Pang et al. |
| 2008/0228567 | A1 | 9/2008 | Williams et al. |
| 2008/0243864 | A1 | 10/2008 | McGauley et al. |
| 2009/0026255 | A1 | 1/2009 | Besecker et al. |
| 2009/0094125 | A1 | 4/2009 | Killian et al. |
| 2009/0132381 | A1 | 5/2009 | Gangi |
| 2009/0204504 | A1 | 8/2009 | De Araujo et al. |
| 2009/0240704 | A1 | 9/2009 | Zimowski |
| 2010/0106801 | A1 | 4/2010 | Bliss et al. |
| 2010/0306080 | A1 | 12/2010 | Trandal et al. |
| 2011/0040801 | A1 | 2/2011 | Macaleer et al. |
| 2011/0125565 | A1 | 5/2011 | MacIlwaine et al. |
| 2011/0184822 | A1 | 7/2011 | Matkovic |
| 2011/0191252 | A1 | 8/2011 | Dai |
| 2011/0231228 | A1 | 9/2011 | Chatter et al. |
| 2012/0016759 | A1 | 1/2012 | Lee et al. |
| 2012/0016760 | A1 | 1/2012 | Lee et al. |
| 2012/0016856 | A1 | 1/2012 | Gandhi et al. |
| 2012/0089467 | A1 | 4/2012 | Camparelli |
| 2012/0221403 | A1 * | 8/2012 | Brown ............... G06Q 30/02 705/14.35 |
| 2012/0271717 | A1 * | 10/2012 | Postrel ............... G06Q 30/02 705/14.58 |
| 2013/0179311 | A1 | 7/2013 | Lee et al. |
| 2013/0304553 | A1 | 11/2013 | Hertel et al. |

FOREIGN PATENT DOCUMENTS

| | | |
|---|---|---|
| JP | 2002-169861 | 6/2002 |
| JP | 2003-242296 | 8/2003 |
| JP | 2005-316932 | 11/2005 |
| JP | 2006-018777 | 1/2006 |
| JP | 2007-172307 A | 7/2007 |
| JP | 2008-543529 A | 12/2008 |
| KR | 10-2002-0096730 A | 12/2002 |
| KR | 10-2004-0105406 A | 12/2004 |
| KR | 10-2006-0026115 A | 3/2006 |
| KR | 10-2007-0086568 A | 8/2007 |
| KR | 10-2009-0000724 A | 1/2009 |
| WO | 1995/030199 A1 | 11/1995 |
| WO | 2005/103968 A1 | 11/2005 |
| WO | 2007/002536 A2 | 1/2007 |
| WO | 2012/009596 A2 | 1/2012 |
| WO | 2012/009655 A2 | 1/2012 |
| WO | 2012/009657 A2 | 1/2012 |
| WO | 2013/170102 A1 | 11/2013 |

OTHER PUBLICATIONS

U.S. Appl. No. 13/781,747 to Sunnyvale et al. filed Feb. 28, 2013.
U.S. Appl. No. 13/244,810 to Lee et al. filed Sep. 26, 2011.
U.S. Appl. No. 13/440,827 to Hertel et al. filed Apr. 5, 2012.
Crawley, T. Office Action issued in copending U.S. Appl. No. 13/440,827, filed Apr. 5, 2012 pp. 1-19 dated Jul. 8, 2015.
Frenel, V. Office Action issued in copending U.S. Appl. No. 13/781,747, filed Feb. 28, 2013 pp. 1-10 dated Mar. 2, 2015.
Kojima, T. Japanese Office Action issued in Japanese Application No. 2013-148419 pp. 1-3 dated Mar. 23, 2015.
Frenel, "Office Action issued in copending U.S. Appl. No. 13/781,747, filed Feb. 28, 2013", dated Sep. 9, 2015, 1-11.
Crawley, T. Office Action issued in co-pending U.S. Appl. No. 13/440,827, filed Apr. 5, 2012 pp. 1-12 dated Dec. 18, 2013.
Lee, K.J. Korean Office Action issued in Application No. 10-2013-7003590 pp. 1-8 dated Jan. 10, 2014.
Crawley, T. Office Action issued in copending U.S. Appl. No. 13/440,827, filed Apr. 5, 2012 pp. 1-17 dated Dec. 5, 2014.
Frenel, V. Office Action issued in copending U.S. Appl. No. 13/781,747, filed Feb. 28, 2013 pp. 1-8 dated Sep. 9, 2014.
Gabriel, C. EPO Office Action issued in Application No. 11807580.3 pp. 1-5 dated May 22, 2014.
Kojima, T. Japanese Office Action issued in Japanese Application No. 2013-148419 pp. 1-6 dated Jul. 14, 2014.
Kang, "Korean Office Action issued in Korean Application No. 10-2013-7003432", dated Mar. 31, 2017, 10 pages of English Translation and 9 pages of Korean Office Action.
Kang, "Korean Office Action issued in Korean Application No. 10-2013-7003432", dated Nov. 22, 2016, 4 pages of English Translation and 3 pages of Korean Office Action.
IBM, "User's Guide and Reference Version 2.0.5.0", Version 2.0.5.0, IBM Migration Toolkit, Jan. 2008, 541 pages.
Park, "Korean Office Action issued in Korean Application No. 10-2013-7003434", dated Mar. 17, 2017, 8 pages of English Translation and 6 pages of Korean Office Action.

(56) References Cited

OTHER PUBLICATIONS

Refai, "U.S. Office Action issued in copending U.S. Appl. No. 13/244,810, filed Sep. 26, 2011", dated Dec. 7, 2016, 11 pages.
Refai, "U.S. Office Action issued in copending U.S. Appl. No. 13/244,810, filed Sep. 26, 2011", dated Nov. 22, 2017, 11 pages.
Kang, "Korean Office Action issued in Korean Application No. 10-2013-7003432", dated Dec. 5, 2017, 4 pages of English Translation and 3 pages of Korean Office Action.
Kang, "Korean Office Action issued in Korean Application No. 10-2013-7003432", dated Jul. 31, 2017, 3 pages of English Translation and 3 pages of Korean Office Action.
Refai, "U.S. Office Action issued in copending U.S. Appl. No. 13/244,810, filed Sep. 26, 2011", dated Aug. 1, 2016, 11 pages.
Kang, "Korean Office Action issued in Korean Application No. 10-2018-7003343", dated Aug. 31, 2018, 7 pages of English Translation and 6 pages of Korean Office Action.
Refai, "U.S. Office Action issued in co-pending U.S. Appl. No. 13/244,810, filed Sep. 26, 2011", dated Apr. 26, 20185, 14 pages.
Crawley, "U.S. Office Action issued in copending U.S. Appl. No. 13/440,827, filed Apr. 5, 2012", dated Jun. 20, 2012, 15 pages.
Crawley, "U.S. Office Action issued in copending U.S. Appl. No. 13/440,827, filed Apr. 5, 2012", dated Sep. 4, 2014, 13 pages.
Crawley, "U.S. Office Action issued in copending U.S. Appl. No. 13/440,827, filed Apr. 5, 2012", dated Jan. 17, 2013, 13 pages.
Kim, "International Search Report and Written Opinion issued in International Application No. PCT/US2013/040450" dated Aug. 27, 2013, 13 pages.
Nakamura, "International Preliminary Report on Patentability issued in International Application No. PCT/US2013/040450", dated Nov. 20, 2014, 10 pages.
Vanderhorst, "U.S. Office Action issued in copending U.S. Appl. No. 13/467,864, filed May 9, 2012", dated Jan. 31, 2013, 22 pages.
Vanderhorst, "U.S. Office Action issued in copending U.S. Appl. No. 13/467,864, filed May 9, 2012", dated Aug. 21, 2012, 17 pages.
Vanderhorst, "U.S. Office Action issued in copending U.S. Appl. No. 13/467,864, filed May 9, 2012", dated Oct. 22, 2013, 24 pages.
Bai, "International Preliminary Report on Patentability issued in International Application No. PCT/US2011/044110" dated Jan. 24, 2013, 6 pages.
Lee, "International Search Report and Written Opinion issued in International Application No. PCT/US2011/044110", dated Jan. 16, 2012, 9 pages.
Stopford, "Office Action issued in Australian Application No. 2011279101", dated Nov. 14, 2013, 3 pages.
Le, Hung D. "U.S. Office Action issued in copending U.S. Appl. No. 12/859,022, filed Aug. 18, 2010", dated Feb. 27, 2012, 8 pages.
IBM, "User's Guide and Reference", IBM Migration Toolkit, Version 2.0.5.0, 2008, 541 pages.
Le, Hung D. "U.S. Office Action issued in copending U.S. Appl. No. 12/859,022, filed Aug. 18, 2010", dated Nov. 5, 2012, 17 pages.
Le, Hung D. "U.S. Office Action issued in copending U.S. Appl. No. 12/859,022, filed Aug. 18, 2010" dated Jul. 16, 2012, 15 pages.
Cussac, "International Preliminary Report on Patentability issued in International Application No. PCT/US2011/044227", dated Jan. 24, 2013, 5 pages.
Jeong, "International Search Report and Written Opinion issued in International Application No. PCT/US2011/044227", dated Mar. 28, 2012, 8 pages.
Ahmad, "Office Action issued in Australian Application No. 2011278977", dated Mar. 27, 2013, 3 pages.
Obeid, "U.S. Office Action issued in copending U.S. Appl. No. 13/244,810, filed Sep. 26, 2011", dated Mar. 26, 2012, 13 pages.
Obeid, "U.S. Office Action issued in copending U.S. Appl. No. 13/244,810, filed Sep. 26, 2011", dated Jul. 27, 2012, 15 pages.
Obeid, "U.S. Office Action issued in copending U.S. Appl. No. 13/184,210, filed Jul. 15, 2011", dated Mar. 23, 2012, 13 pages.
Kim, "International Search Report and Written Opinion issued in International Application No. PCT/US2011/044220", dated Apr. 6, 2012, 9 pages.
Linder, "International Preliminary Report on Patentability issued in International Application No. PCT/US2011/044220", dated Jan. 24, 2013, 6 pages.
Gabriel, "Extended European Search Report issued in European Application No. 11807580.3", dated Jan. 21, 2014, 4 pages.
Joshi, "Office Action issued in Australian Application No. 2013206485", dated May 28, 2015, 2 pages.
Almatrahi, "U.S. Office Action issued in copending U.S. Appl. No. 13/244,802, filed Sep. 26, 2011", dated Dec. 7, 2011, 4 pages.

\* cited by examiner

POINT OF SALE OFFER REDEMPTIONS

REFERENCE TO RELATED APPLICATIONS

This application is a continuation of U.S. patent application Ser. No. 13/467,864 filed on May 9, 2012 and entitled "Point of Sale Offer Redemptions." The complete disclosure of the above-identified application is hereby fully incorporated herein by reference.

TECHNICAL FIELD

The present disclosure relates generally to contactless devices and more particularly to methods and systems that allow for processing of point of sale (POS) redemptions via a "tap" of a contactless device with a POS data collector.

BACKGROUND

Merchants have offered coupons or rebates as incentives for purchasing particular products for some time. Traditionally, coupons are distributed in a paper format. A user redeems the coupon by physically taking it to a merchant and purchasing a product that satisfies the terms of the coupon. Such system is limited in that users are required to clip or print out paper coupons and present such coupons to the merchant to redeem the discount. Other forms of traditional coupons included rebates for purchasing particular products, wherein after purchasing a product that satisfies the terms of the rebate offer, the user fills out and returns required forms to request the rebate. Such system is also limited in that the redemption is not automatically applied and the user is required to submit additional paperwork to receive the redemption at a later time. Also, because such rebates are usually requested and/or sent by mail, they carry a great deal of unreliability and hassle for the user.

More recently, merchants have offered electronic coupons linked to merchant loyalty cards. A user enrolls in a merchant's loyalty program and receives a loyalty card. A user then associates certain discounts to the loyalty card and redeems these discounts by presenting the loyalty card (or some form of identifying information, such as a telephone number) and the method of payment to the merchant when purchasing the discounted products. In other circumstances, discounts are automatically associated with the loyalty card and are redeemed by presenting the loyalty card (or some form of identifying information, such as a telephone number) and the method of payment to the merchant when purchasing the discounted products. However, such systems are limited in that users are required to present a loyalty card (or some form of identifying information, such as a telephone number), in addition to the method of payment, to redeem the discount.

Near Field Communication (NFC) is a proximity communication technology that can enable contactless device payment technologies and that is supported by the Global System for Mobile Communications (GSM) Association. Radio frequency identification (RFID) is another wireless communication technology that can be adapted to enable NFC contactless device payment technology. NFC communication generally is conducted in a range from about 3 to about 4 inches. Such short communication distances limit enable secure communication between close field proximity enabled devices. In operation of an NFC transaction, a user "taps" a contactless device, such as an NFC-enabled mobile phone, to a reader of a point of sale (POS) system. The reader recognizes the NFC-enabled device when the device is moved within range of the reader, establishes a secure communication channel with the device, and initiates a payment transaction between the reader and the device. NFC contactless payment devices can function as a credit card to enable purchases at the point-of-sale. During the conventional transaction, the device and the reader communicate to complete the predefined transaction.

SUMMARY

In certain exemplary aspects, a method of allowing processing of POS redemptions via a "tap" of a contactless device comprises a POS data collector that facilitates a secure and convenient connection with a contactless device. The merchant scans items for purchase using a POS scanner, which captures product identification information. The POS scanner forwards the product identification information to a POS terminal. The POS data collector intercepts the product identification information (for example, the bar code information) between the POS scanner and the POS terminal. A user taps the contactless device in the POS data collector's radio frequency field, and a communication channel is established between the contactless device and the POS data collector. The POS data collector identifies the user via the contactless device and identifies coupons, merchant offers, and value-added services to redeem with the transaction. The POS data collector forwards this information to the POS terminal, the redemptions are applied to the transaction, and the communication is terminated.

These and other aspects, objects, features, and advantages of the exemplary embodiments will become apparent to those having ordinary skill in the art upon consideration of the following detailed description of illustrated exemplary embodiments, which include the best mode of carrying out the invention as presently presented.

DETAILED DESCRIPTION OF EXEMPLARY EMBODIMENTS

Overview

Figure 1:
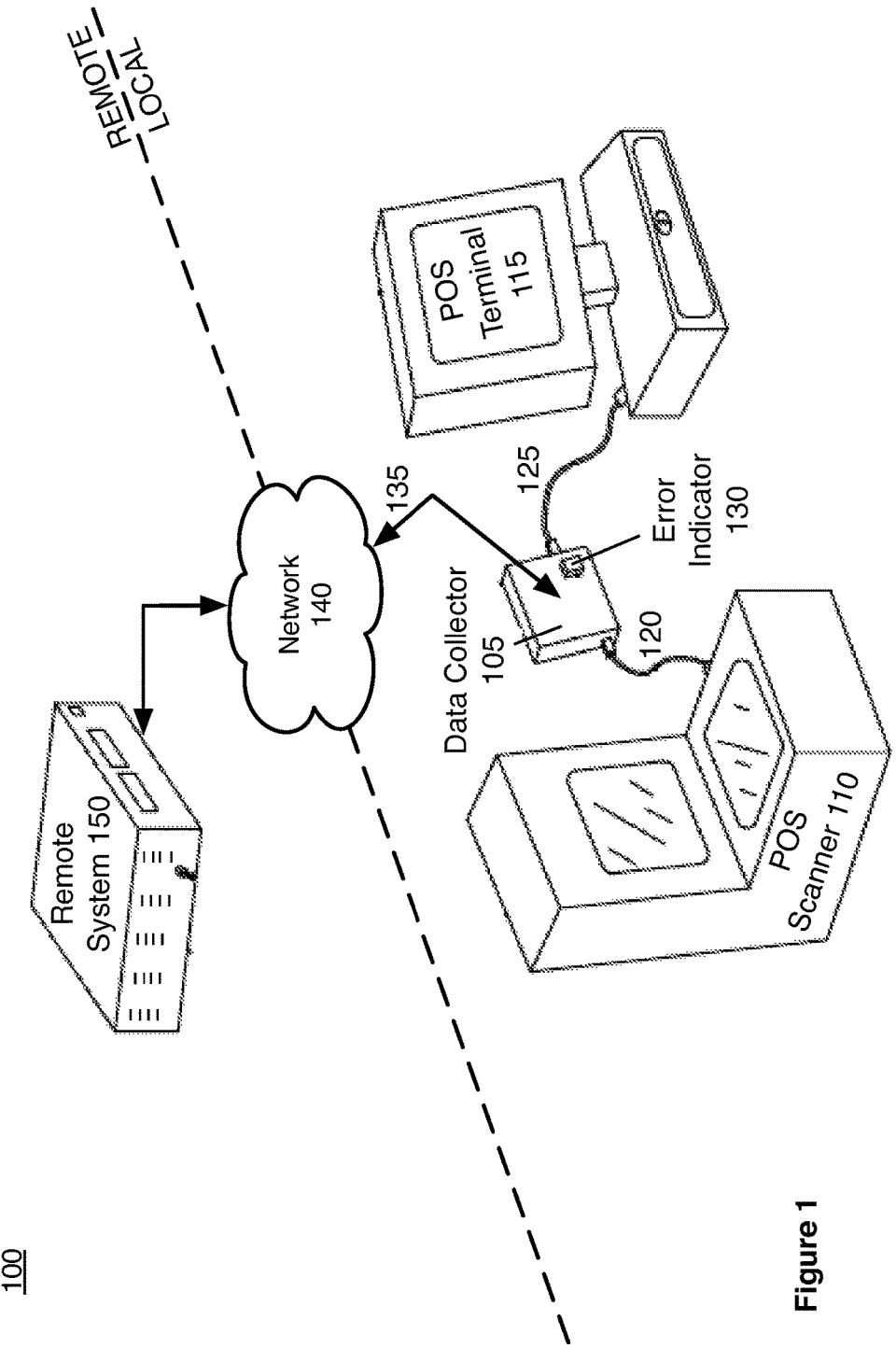
FIG. 1 is a block diagram depicting a system for collecting POS data, in accordance with certain exemplary embodiments.

The exemplary embodiments provide methods and systems that enable users to utilize point of sale processing of redemptions with a tap of a contactless device. The merchant scans items for purchase using a POS scanner, which captures product identification information. The POS scanner forwards the product identification information to a POS terminal. A POS data collector intercepts the product identification information (for example, bar code information) between the POS scanner and the POS terminal. A user taps the contactless device in the POS data collector's radio frequency field, and a communication channel is established between the contactless device and the POS data collector. The POS data collector identifies the user via the contactless device. The POS data collector utilizes the user identification information and accesses the user's saved redemption offers (for example, product, merchant, or manufacturer coupons, merchant offers, loyalty and rewards offers, prepaid offers, check-ins, membership cards, ticketing other value-added services, and other suitable offers) stored in a remote system. The POS data collector or the remote system identifies the coupons, merchant offers, and other value-added services available for the transaction by comparing the product identification information with the saved redemption offers. If multiple items are available for a single product or for the purchase, the user may be prompted to select the item(s) to apply to the transaction. The POS data collector obtains the coupon, merchant offer codes, and other value-added service identifiers from the remote system and forwards those items to the POS terminal to be redeemed during the transaction.

In an alternative exemplary embodiment, the POS data collector accesses saved coupons, offers, and other value-added services stored in the contactless device, for example, in a digital wallet of the contactless device.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as the act may be performed by more than one computer. The inventive functionality of the invention will be explained in more detail in the following description, read in conjunction with the figures illustrating the program flow.

The functionality of the exemplary embodiments will be explained in more detail in the following description, read in conjunction with the figures illustrating the program flow.

System Architecture

FIG. 1 depicts a system 100 for collecting POS data, in accordance with certain exemplary embodiments. As depicted in FIG. 1, the system 100 may comprise POS data collector 105, POS scanner 110, POS terminal 115, and remote system 150. POS data collector 105 may be connected to POS scanner 110 via connection 120, and to POS terminal 115 via connection 125. POS data collector 105 may communicate with POS scanner 110 and POS terminal 115 using any standard or proprietary storage and/or communication protocol, including without limitation, universal serial bus (USB), RS-232, and/or any combination thereof. And while the embodiment in FIG. 1 depicts wired connections 120 and 125, either or both of these connections may be replaced with a wireless communication link (for example, Wi-Fi, MiFi, NFC, Bluetooth, etc.) in accordance with certain other exemplary embodiments. Additionally, while POS data collector 105 is depicted as a standalone hardware device in FIGS. 1 and 2, one or more components of POS data collector 105 may be integrated into one or both of POS scanner 110 and POS terminal 115, in accordance with alternative exemplary embodiments. For example, one or more components of POS data collector 105 may be implemented as a software module or firmware in one or both of POS scanner 110 and/or POS terminal 115.

Figure 2:
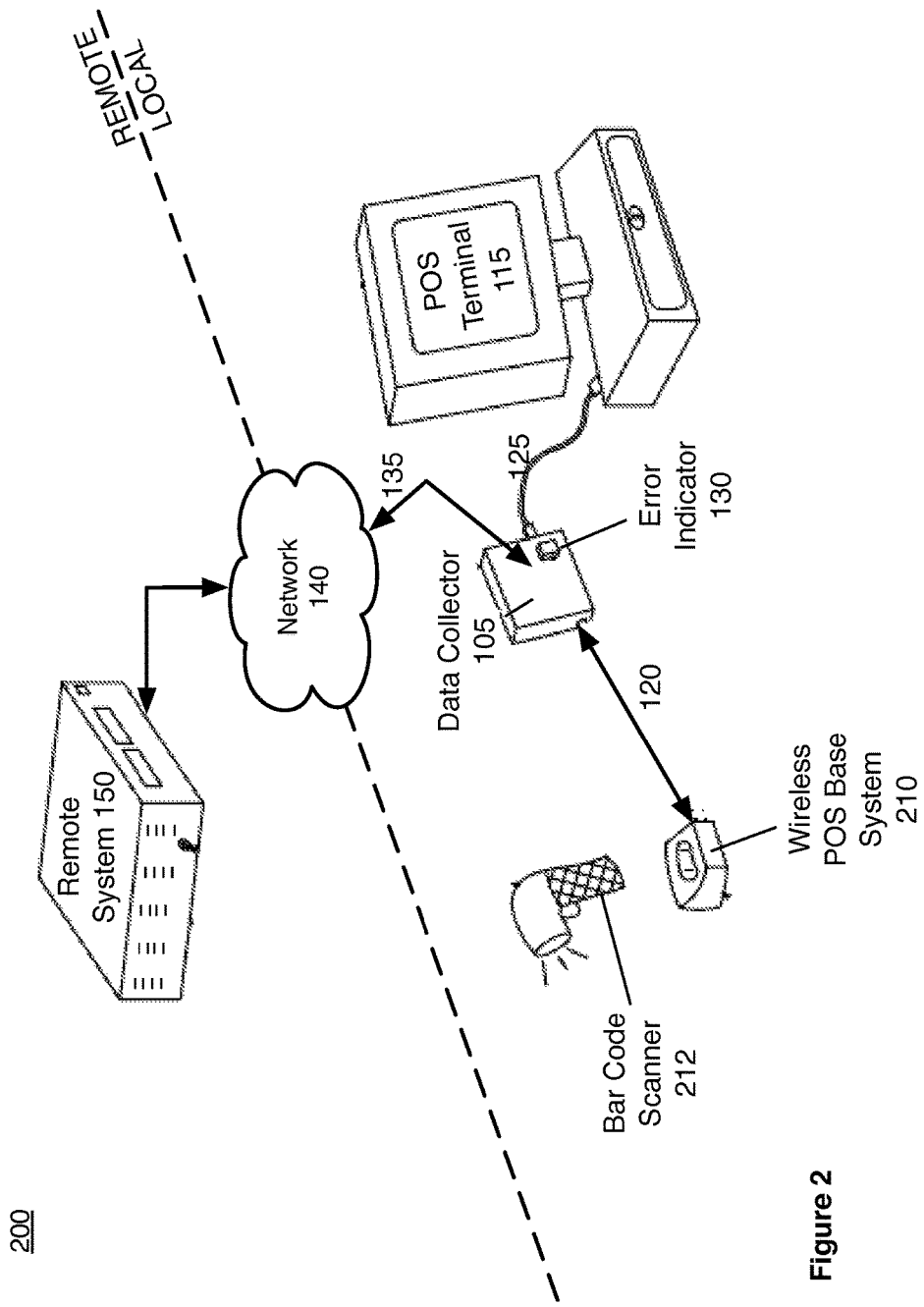
FIG. 2 is a block diagram depicting a system for collecting POS data, in accordance with certain exemplary embodiments.

As depicted in FIG. 1, the POS scanner 110 may be a traditional wired, generally stationary barcode scanner, in accordance with certain exemplary embodiments. FIG. 2 depicts system 200 according to an alternative embodiment wherein POS scanner includes POS wireless barcode scanner 212 and POS wireless base station 210. In this alternative embodiment, POS data collector 105 may communicate with POS wireless base station 210 in the same way the POS data collector 105 communicates with POS scanner 110 of FIG. 1. While FIGS. 1 and 2 illustrate different exemplary embodiments, it should be appreciated that the POS data collector 105 may be used similarly in POS systems with hardware that varies from that depicted in FIGS. 1 and 2.

According to an exemplary embodiment, POS scanner 110 may be a barcode scanner and may be configured to read any number of barcode formats, including, without limitation UPC, EAN, JAN, etc. According to other exemplary embodiments, POS scanner 110 may be an RFID reader or any other device that is capable of reading product identifier information in a POS system.

As further depicted in FIG. 1, POS data collector 105 may be communicatively coupled to remote system 150 via network 140. Network 140 may be implemented as, or may be a part of, a storage area network (SAN), personal area network (PAN), local area network (LAN), a metropolitan area network (MAN), a wide area network (WAN), a wireless wide area network (WWAN), a wireless local area network (WLAN), a virtual private network (VPN), an intranet, the Internet, Bluetooth, NFC or any other appropriate architecture or system that facilitates the communication of signals, data and/or messages (generally referred to as data). POS data collector 105 may connect to network 140 via connection 135. According to an exemplary embodiment, connection 135 may be a dedicated cellular modem connection. In an alternative embodiment, connection 135 may be a wired Ethernet connection, a Wi-Fi or Bluetooth connection to a hotspot that has a wired/wireless Internet connection (for example, MiFi), or any other wired or wireless connection suitable for communicating signals with network 140.

The exemplary remote system 150 enables storage of one or more redemption offers. In an exemplary embodiment, the user (not illustrated) creates a user account with the remote system 150 that is accessible by the POS data collector 105. In an exemplary embodiment, the user account information stored in the remote system 150 is also stored on the contactless device 510.

Figure 3:
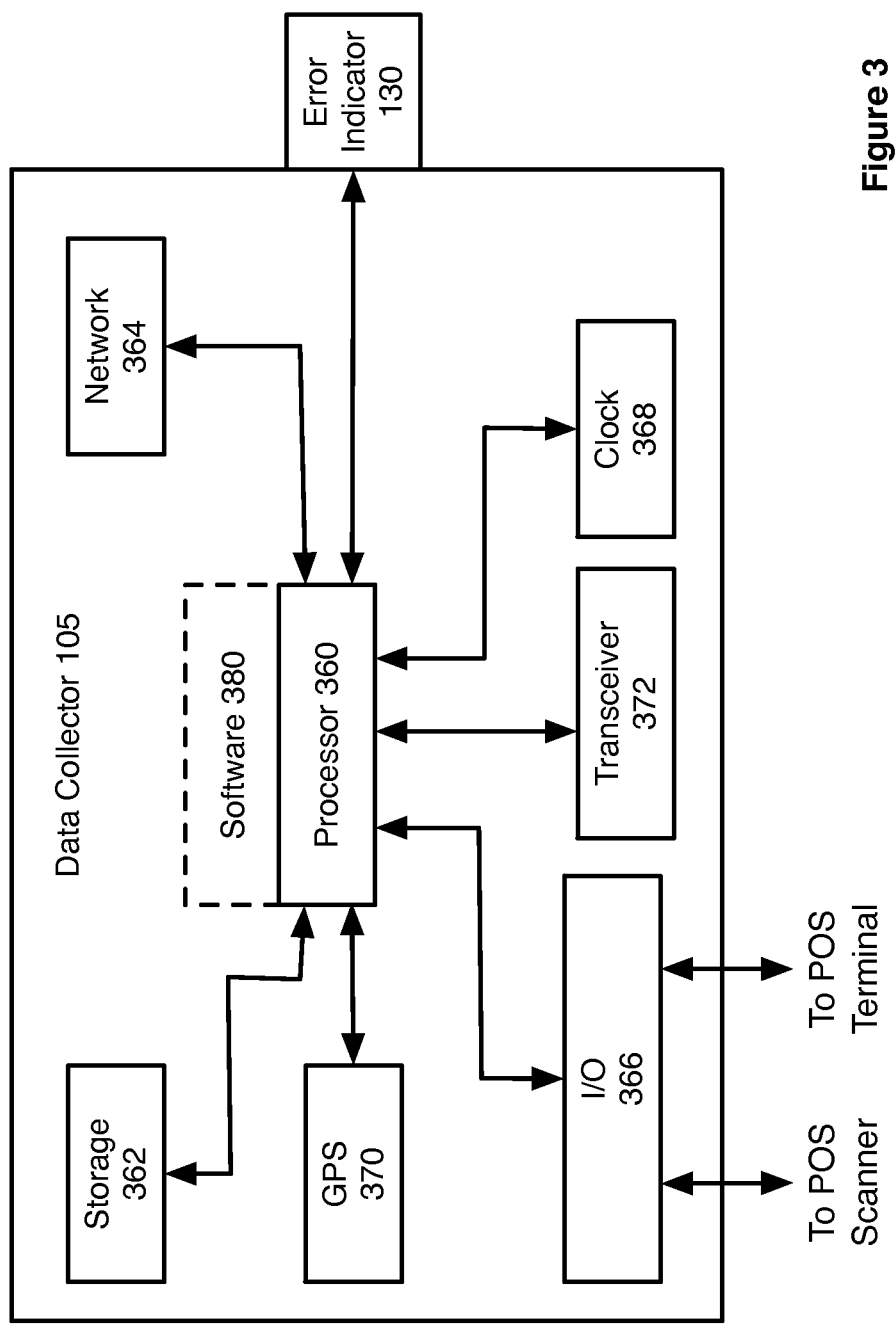
FIG. 3 is a block diagram depicting a POS data collector, in accordance with certain exemplary embodiments.
Figure 5:
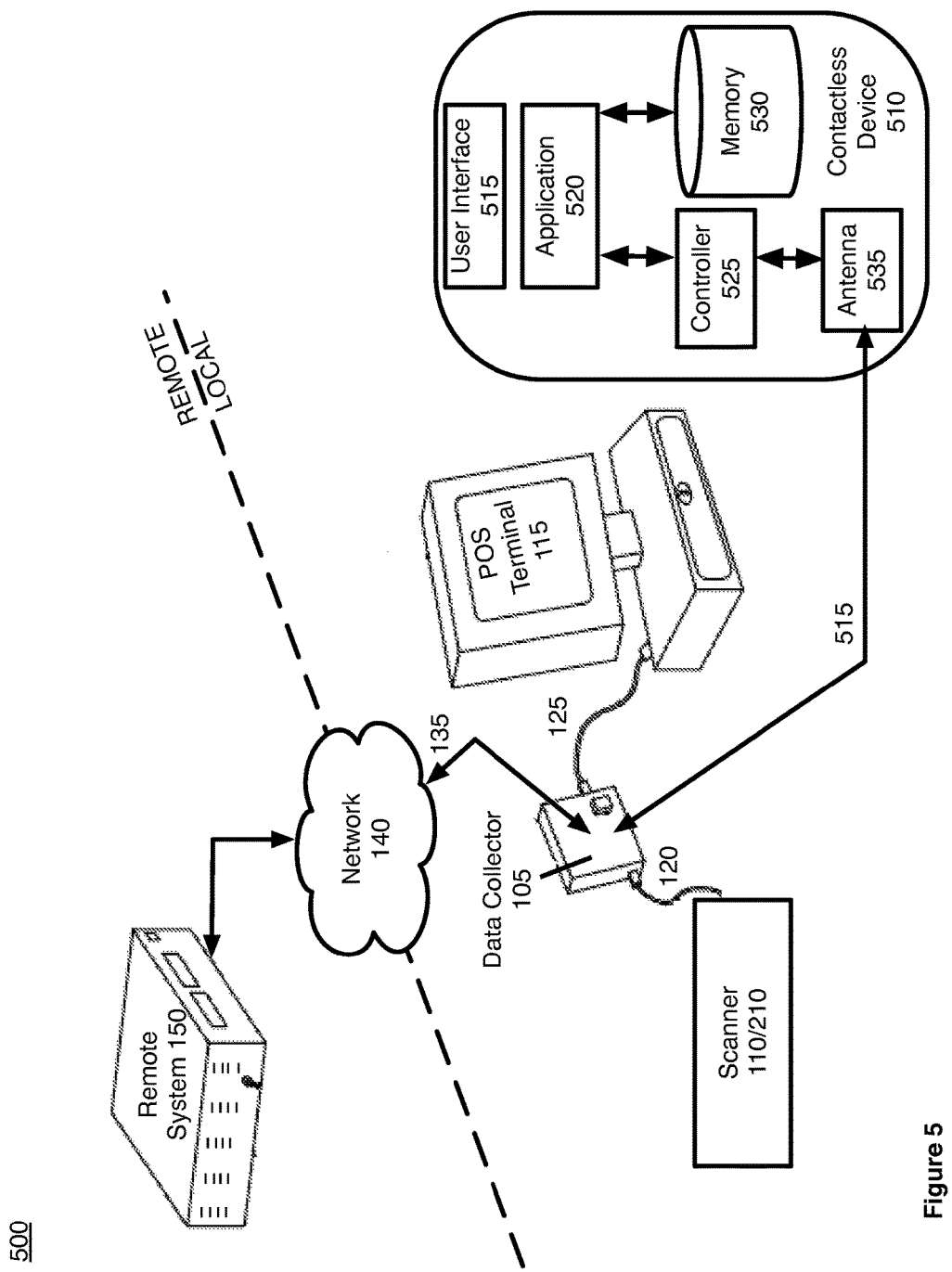
FIG. 5 is a block diagram depicting a system for processing POS redemptions, in accordance with certain exemplary embodiments.

FIG. 3 depicts a block diagram of POS data collector 105, in accordance with certain exemplary embodiments. Components of POS data collector 105 may include, but are not limited to, processor 360, storage resource 362, network module 364, input/output (I/O) module 366, clock module 368, GPS module 370, transceiver 372, and error indicator 130 (error indicator 130 is also depicted in FIGS. 1, 2, and 5). As depicted, processor 360 may be communicatively coupled to each of the other components of POS data collector 105.

Processor 360 may comprise any system, device, or apparatus operable to interpret and/or execute program instructions and/or process data associated with software module 380, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 360 may interpret and/or execute program instructions and/or process data stored locally (for example, in storage resource 362). In the same or alternative embodiments, processor 360 may interpret and/or execute program instructions and/or process data stored remotely (for example, in a network storage resource (not depicted) of network 140 of FIGS. 1 and 2).

Local storage resource 362 may comprise computer-readable media (for example, hard disk drive, floppy disk drive, CD-ROM, and/or other type of rotating storage media, flash memory, EEPROM, and/or other type of solid state storage media) and may be generally operable to store data.

Network module 364 may be any suitable system, apparatus, or device operable to serve as an interface between information POS data collector 105 and network 140 (FIGS. 1 and 2). Network module 364 may enable information POS data collector 105 to communicate over network 140 using any suitable transmission protocol and/or standard, including without limitation all transmission protocols and/or standards enumerated above with respect to the discussion of network 140 and connection 135.

I/O module 366 may be any system, device, or apparatus generally operable to receive and/or transmit data to/from/ within information POS data collector 105. I/O module 366 may comprise, for example, any number of communication interfaces, including without limitation a USB interface and/or an RS-232 interface.

Clock module 368 may be any system, device, or apparatus generally operable to maintain an internal clock. According to certain exemplary embodiments, clock module 368 may synchronize with the UTC (coordinated universal time). Additionally, clock module 368 may be configured to maintain an accurate internal clock when power to POS data collector 105 is removed (for example, via an independent battery power source).

GPS module 370 may be any system, device, or apparatus generally operable to determine and provide the location of POS data collector 105 based on global positioning satellite signals or other similar methods (for example, via location information received by network module 364).

Transceiver 372 comprises a reader and/or antenna to receive information from and communicate information to a contactless device 510 (depicted in FIG. 5). The transceiver 372 receives information from the contactless device 510 and communicates the received information to the processor 360. The transceiver 372 also receives information from the processor 360 and communicates the received information to the contactless device 510.

Error indicator 130 may be any system, device, or apparatus generally operable to provide an indication that may be detected visually or audibly by a person near POS data collector 105. For example, error indicator 130 may be a visible LED light, in accordance with certain exemplary embodiments. In the same or alternative embodiments, error indicator may be an audible speaker capable of producing an audible noise.

The POS data collector 105 is described in more detail hereinafter with reference to the methods depicted in FIG. 4.

FIG. 5 is a block diagram depicting a system 500 for processing POS redemptions, in accordance with certain exemplary embodiments. As depicted in FIG. 5, the exemplary operating environment 500 includes a POS data collector system 105 disposed between the POS scanner 110 or a wireless POS scanner 212/210 and the POS terminal 115, the remote system 150, and a contactless device system 510 that are configured to communicate with one another via one or more communication channels 120, 125, 135, 140, 515.

In exemplary embodiments, the communication channel 515 comprises a proximity communication connection, such as Bluetooth, Wi-Fi, or near field communication ("NFC").

In an exemplary embodiment, the contactless device system 510 refers to a smart device that can communicate via an electronic, magnetic, or radio frequency field between the device 510 and another device, such as the POS data collector 105 or POS scanner 110 or 212/210. In an exemplary embodiment, the contactless device 510 comprises processing capabilities, such as storage capacity/memory 530 and one or more applications 520 that can perform a particular function. In an exemplary embodiment, the contactless device 510 comprises an operating system (not illustrated) and a user interface 515. Exemplary contactless devices 510 include smart phones; mobile phones; personal digital assistants ("PDAs"); mobile computing devices, such as netbooks and iPads; other electronically enabled key fobs; electronically enabled credit card type cards; and other devices, in each case having processing and user interface functionality. Certain contactless devices 510 can be used for multiple purposes, including financial transactions, coupons, ticketing, secure authentication, other value-added services, and other related applications.

The controller 525 interacts with a secure key encrypted application, which can be an application 520, for decryption and installation in a secure element (not illustrated) of the contactless device 510. In an exemplary embodiment, the controller 525 is a Bluetooth link controller. The Bluetooth link controller can send and receive data, identifying the POS data collector 105, performing authentication and ciphering functions, and directing how the contactless device 510 will listen for transmissions from the POS data collector 105 or configure the contactless device 510 into various power-save modes according to the Bluetooth-specified procedures. In another exemplary embodiment, the controller 525 is a Wi-Fi controller or an NFC controller capable of performing similar functions via corresponding protocols.

The application 520 is a program, function, routine, applet or similar entity that exists on and performs its operations on the contactless device 510. For example, the application 520 may be one or more of a digital wallet application, a coupon application, a loyalty card application, another value-added application, a user interface application, or other suitable application operating on the contactless device 510. Additionally, the secure element (not illustrated) also may comprise secure contactless software applications, such as payment applications, secure forms of the applications 520, authentication applications, payment provisioning applications, or other suitable application using the secure functionality of the secure element.

In an exemplary embodiment, the contactless device 510 includes a digital wallet application 520. The exemplary digital wallet application 520 can interact with a web browser (not illustrated) or can be embodied as a companion application of the web browser. As a companion application, the digital wallet application 520 executes within the web browser (not illustrated). That is, the digital wallet application 520 may be an application program embedded in the web browser (not illustrated). In an exemplary embodiment, the digital wallet application 520 also can interact with the remote system 150.

The contactless device 510 also includes a memory 530 accessible by the digital wallet application 520 and a web server (not illustrated). The exemplary memory 530 can include one or more tangible computer-readable storage devices. The memory 530 can be disposed in the contactless device 510 or can be logically coupled to the contactless device 510.

The exemplary digital wallet application 520 enables storage of one or more redemption offers. In an exemplary embodiment, the redemption offers can be maintained by the digital wallet application 520 and stored in the memory 530. In an alternative exemplary embodiment, the redemption offers can be maintained by the remote system 150. In an exemplary embodiment, the redemption offers can be maintained by the remote system 150 and accessible by the digital wallet application 520.

The contactless device 510 communicates with the POS data collector 105 via an antenna 535 that communicates with the transceiver 372 of the POS data collector 105 via the communication channel 515. In an exemplary embodiment, once the contactless device application 520 has been activated and prioritized, the controller 525 is notified of the state of readiness of the contactless device 510 for a transaction. The controller 525 outputs through the antenna 535 a radio signal, or listens for radio signals from the POS data collector 105. On establishing a communication channel between the contactless device 510 and the POS data collector 105, the POS data collector 105 requests the list of available applications 520 from the contactless device 510. A directory is first displayed, after which, based on the set priority or the type of POS data collector 105, an application 520 is chosen and initiated for the transaction. The method for processing a POS redemption is described in more detail hereinafter with reference to the methods described in FIGS. 6-10.

System Process

Figure 4:
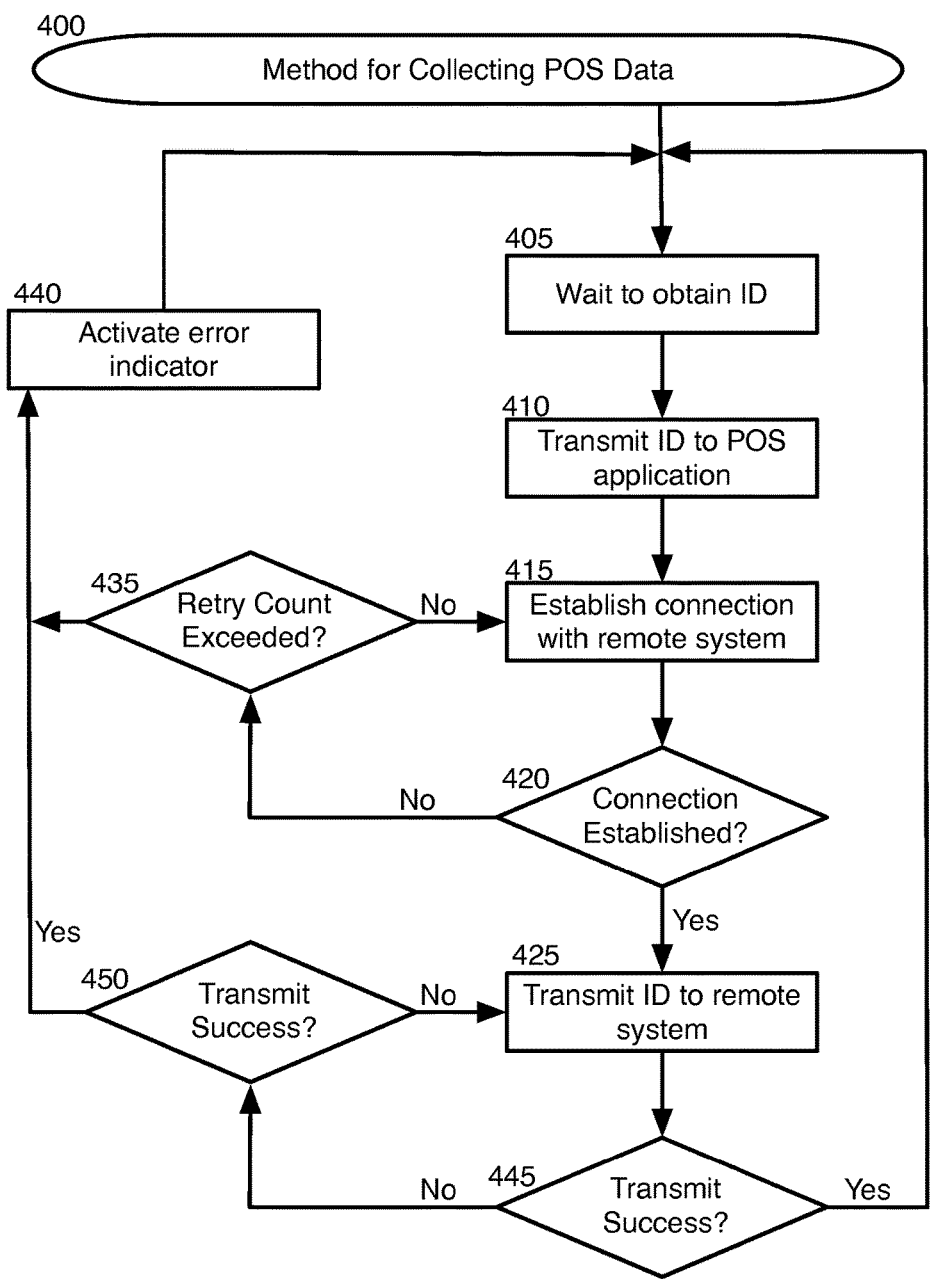
FIG. 4 is a block flow diagram depicting a method for collecting POS data, in accordance with certain exemplary embodiments.

FIG. 4 is a block flow diagram depicting a method 400 for collecting POS data, in accordance with certain exemplary embodiments. The method 400 is described with reference to components illustrated in FIGS. 1-3.

In block 405, a software module 380 of a POS data collector 105 may wait to obtain a product identifier associated with a product that is being purchased. For example, POS scanner 110 is used to scan the barcode of a product that is being purchased. After scanning, the POS scanner 110 transmits the product identifier for processing by a POS application running on POS terminal 115. Because the POS data collector 105 is communicatively coupled between POS scanner 110 and POS terminal 115, POS data collector 105 may obtain the product identifier associated with the purchased product as the identifier is transmitted to the POS terminal 115.

In block 410, software module 380 may transmit an unmodified version of the product identifier to POS terminal 115. In accordance with certain exemplary embodiments, this transmission may be performed without noticeable delay so that the addition of POS data collector 105 to POS system 100 does not interfere with the normal business flow. In other words, the POS application running on POS terminal 115 will be able to proceed with the purchase transaction, and will not be noticeably delayed by the addition of the POS data collector 105 to POS system 100.

In block 415, the software module 380 may establish a connection with remote system 150 via network module 364 and network 140. According to an exemplary embodiment, software module 380 may establish this connection by resolving the host name and/or address via DNS or other protocols, and subsequently communicating with remote system 150 to establish the connection. If a connection is successfully established (block 420), software module 380 may proceed to block 425 and may transmit the product identifier to remote host 150. According to certain exemplary embodiments, this transmission may be via the HTTPS protocol, or any other protocol suitable for communicating data over network 140 to remote system 150. According to exemplary embodiments that utilize the HTTPS protocol, software module 380 may verify the validity of the SSL certificate, and may not transmit data if validity is not established.

According to an exemplary embodiment, the data transmission in block 425 may include only the product identifier. In other embodiments, software module 380 may transmit additional data to remote server 150. In both cases, and according to the HTTPS protocol used in an exemplary embodiment, the transmitted data may be sent as a body of a POST request over HTTPS. Thus, when only the product identifier is transmitted, the body of the POST request may contain the following fields:

scan:<product_identifier>

In an alternative embodiment, software module 380 may provide additional data including, but not limited to, one or more of the following: a merchant identifier, a store identifier (for example, for merchants with more than one store), a scanned product count, a current time stamp, a device identifier (for example, a manufacturer-issued serial number), a security key (for example, for secure communication), a software version number, and a device GPS coordinate. In accordance with this alternative embodiment, the body of the POST request may contain one or more of the following fields:

serial:<device_identifier>
key:<security_key>
version:<software_version>
currenttime:<current_time>
sequence:<scanned_product_count>
store:<store_identifier>
gps:<gps_coordinates>
scan:<product_identifier>

In yet another exemplary embodiment, software module 380 may provide a time stamp indicating when the product identifier was scanned by the POS scanner. According to this embodiment, the body of the POST requests depicted above may be modified as follows:

scan:<product_identifier>:<timestamp>

In block 445, software module 380 may determine if the transmission was successful. For example, according to a transmission via HTTPS, software module 380 may receive a HTTP 200/OK response with an empty body when the transmission is successful. Alternatively, software module 380 may receive either a 4xx or 5xx HTTP error if the transmission is unsuccessful.

If the data transmission is not successful (block 445), software module 380 may proceed to block 450, where it may determine if a predetermined retry count has been exceeded. If the retry count has not been exceeded, software module 380 may increment the retry count and proceed back to block 425 where it may again attempt to transmit the product identifier (and any other data, as described above) to remote system 150. According to an exemplary embodiment, software module 380 may proceed to block 425 immediately. In other embodiments, software module 380 may wait for a predetermined amount of time (for example, 1, 5, 10, etc. minutes) before retrying the transmission. In yet another exemplary embodiment, software module 380 may wait for 1 minute before retrying (the "timeout interval"), and if the next attempted transmission is unsuccessful, double the timeout interval. In this embodiment, software module 380 may continue to double the timeout interval for each consecutive failed transmission attempt until the timeout interval is 32 minutes, at which point software module 380 may keep trying to transmit the data every 32 minutes.

In the event the number of transmission attempts exceeds the predetermined retry count in block 450, software module 380 may proceed to block 440, and may activate error indicator 130. In this manner, an employee of the retail store may be notified that the POS data collector has encountered an error.

Similarly, if a connection is not successfully established (block 420), software module 380 may proceed to block 435, where it may determine if a predetermined retry count has been exceeded. If the retry count has not been exceeded, software module 380 may increment the retry count and proceed back to block 415 where it may again attempt to establish a connection with remote system 150. Here, a timeout interval algorithm similar to that described above may be used. In the event the number of connection attempts exceeds the predetermined retry count in block 435, software module 380 may proceed to block 440, and may activate error indicator 130. In this manner, an employee of the retail store may be notified that the POS data collector has encountered an error.

In the event the error indicator is activated, software module 380 may proceed back to block 405, where it may wait to obtain the next product identifier associated with an additional product that is being purchased. Thus, software module 380 may continue to operate despite the error condition. In this manner, the POS data collector 105 may at least continue to transmit scanned product identifiers to the POS terminal (block 410) so that the error condition does not interfere with business operations. Additionally, POS data collector 105 may continue to collect data for subsequent transmission to the remote system 150 upon resolution of the errors. According to an exemplary embodiment (not depicted), software module 380 may, in such a case, deactivate the error indicator if a subsequent attempt to establish a connection with remote system 150 or to transmit data to remote system 150 is successful.

Thus, according to the exemplary embodiment of FIG. 4, POS data collector 105 may transmit each product identifier essentially in real time as each product is scanned and without significant delay (in other words, no more delay than is necessary for the method steps of FIG. 4 to be performed).

According to an exemplary embodiment and as an alternative to transmitting POS data in real time, POS data collector 105 may accumulate POS data and transmit the accumulated data to remote system 150 periodically. For example, software module 380 may store accumulated product identifiers and corresponding time stamps in storage resource 362 until such time as they are transmitted to remote system 150. In one embodiment, for example, software module 380 may accumulate product identifiers for a predetermined amount of time (for example, 5, 15, 30, etc. minutes) before transmitting the data to remote server 150. In yet another embodiment, software module 380 may accumulate product identifiers and may transmit the data to remote server 150 after a predetermined number of identifiers (for example, 5, 100, 1000, etc.) have been accumulated. In an alternative exemplary embodiment, transmission may occur via a peer-to-peer (P2P) and/or delay-tolerant network (DTN) protocol. For example, POS data collector 105 may transmit the POS data to a merchant's smart phone before to remote system 150.

In still a further embodiment, software module 380 may accumulate POS data and use both a time period and a predetermined product identifier count to determine when to transmit the data to remote system 150. According to this exemplary embodiment, software module 380 may buffer product identifiers for a predetermined amount of time or until a predetermined number of product identifiers are accumulated—whichever comes first. In still another embodiment, software module 380 may accumulate POS data until a predetermined amount of data is accumulated (for example, 1 kB, 1 MB, etc.). Accordingly, the data transmission may be optimized to minimize traffic while still sending updates with reasonable frequency.

Thus, software module 380 may transmit only the accumulated product identifiers, in accordance with an exemplary embodiment. In such a case, the body of an HTTPS request may be formatted as follows:

```
scan:<product_identifier>:<timestamp>
scan:<product_identifier>:<timestamp>
...
```

In embodiments where the software module 380 provides data in addition to the product identifiers, the body of the POST request may contain one or more of the following fields:

```
serial:<device_identifier>
key:<security key>
version:<software version>
currenttime:<current_time>
sequence:<scanned_product_count>
store:<store_identifier>
gps:<gps_coordinates>
scan:<product_identifier>:<timestamp>
scan:<product_identifier>:<timestamp>
...
```

In the exemplary embodiments described above, the connection to remote system 150 via network module 364 and network 140 may be kept open or may be closed between transmissions.

POS data collector 105 may transmit an alive indicator to remote system 150, in accordance with an exemplary embodiment. For example, regardless of whether any products are scanned, software module 380 may send an alive indicator to remote system 150 on a periodic basis (for example, every 4, 6, 8, etc. hours). Software module 380 may transmit an alive indicator using steps similar to those described in FIG. 4. For example, software module 380 may perform the same retry/error algorithm when attempting to establish a connection with remote system 150 and to transmit the alive indicator.

According to exemplary embodiments that utilize the HTTPS protocol for transmission, the HTTPS transmission for an alive indicator may be directed to a URL that is different from the URL used for transmitting product identifier(s). In addition, the body of an alive indicator POST request may contain one or more of the following fields:

```
serial:<device_identifier>
key:<security key>
version:<software version>
currenttime:<current_time>
sequence:<scanned_product_count>
```

Accordingly, remote system 150 may use the alive indicator transmission to monitor POS data collector 105 for errors. In other words, remote system 150 may determine that POS data collector 105 is not operating if it does not receive an alive indicator according to the predetermined periodic schedule. Thus, a POS data collection system provider can arrange to troubleshoot POS data collector 105 in the event it stops operating correctly.

Figure 6:
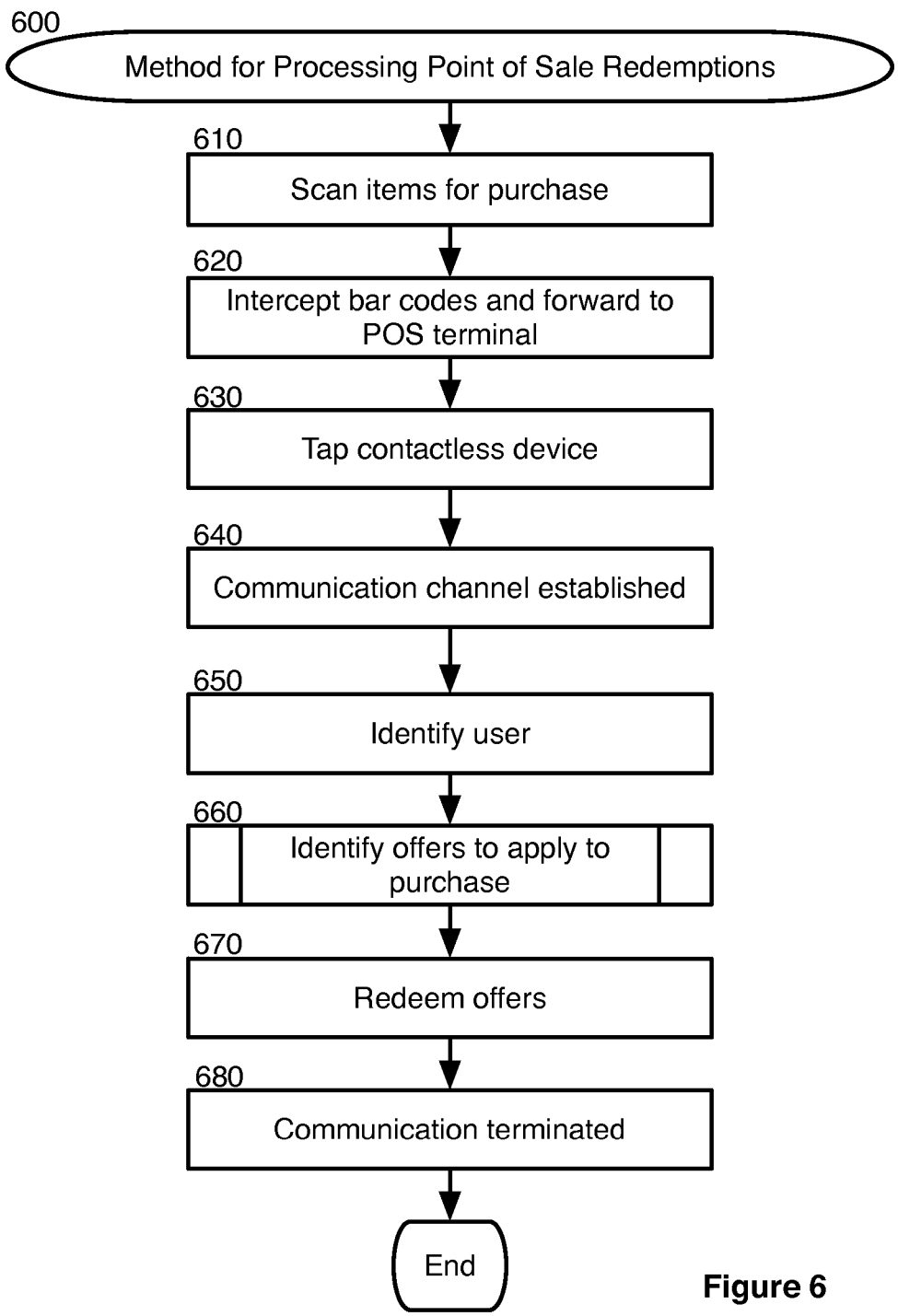
FIG. 6 is a block flow diagram depicting a method for processing POS redemptions, in accordance with exemplary embodiments.

FIG. 6 is a block flow diagram depicting a method 600 for processing POS redemptions, in accordance with exemplary embodiments. The method 600 is described with reference to the components illustrated in FIG. 5.

In an exemplary embodiment, a signal is provided to the data collector 105 that indicates when a previous transaction has ended and a new transaction has started. In an exemplary embodiment, the data collector 105 can detect a signal produced when a receipt is printed at the end of the previous transaction. In this embodiment, the data collector 105 may be communicatively coupled to a printer (not illustrated) that prints a receipt or to the POS terminal 115 that sends an electronic copy of a receipt to the user. In an alternative exemplary embodiment, the cashier may scan a bar code designed to signify the beginning of a new transaction or the end of a transaction. In this embodiment, the data collector 105 may intercept the bar code as it is transmitted from the POS scanner 110/212 or base station 210 to the POS terminal 115. In an additional alternative exemplary embodiment, the cashier may enter a particular key or set of keys at the POS terminal 115. In this embodiment, the data collector 105 would intercept the injected keystrokes from the POS terminal 115. In exemplary embodiment, the cashier may scan a bar code to signal the remote system 150 to look up offer codes to apply to the items scanned after the end of the previous transaction and prior to the termination of the current transaction.

In block 610, the merchant scans items for purchase. In an exemplary embodiment, the merchant scans the bar codes of items using the POS scanner 110. In an alternative exemplary embodiment, the merchant uses the POS bar code scanner 212 coupled to the base station 210 to scan the bar codes of the items for purchase.

In block 620, the POS data collector 105 intercepts the product identifier associated with the bar code of each product being scanned by the POS scanner 110 or 212 as it is transmitted from the POS scanner 110 or base station 210 to the POS terminal 115. The POS data collector 105 stores the information before, or simultaneously with, forwarding the information to the POS terminal 115. Blocks 610 and 620 can be repeated as necessary to capture the product identifier of each product being purchased in the transaction.

The user "taps" the contactless device 510 in the proximity of the POS data collector 105, in block 630. In an exemplary embodiment, the transceiver 372 of the POS data collector 105 generates a radio frequency (RF) or other field continuously polling for the presence of a contactless device 510, and the user "taps" the contactless device 510 by placing the device 510 within the field of the data collector 105. In an exemplary embodiment, the methods described hereinafter may occur in a single "tap" of the contactless device 510. The communication channel established in block 640 discussed hereinafter between the contactless device 510 and the POS data collector 105 may remain open after the "tap," if necessary. In an alternative exemplary embodiment, the methods described hereinafter may require further interaction, taps, or user input.

In block 640, the POS data collector 105 detects the contactless device 510 and establishes a communication channel with the contactless device 510. In exemplary embodiments, the communication channel can be secure, if desired, for communicating sensitive data. Alternatively, the communication channel can be unsecure, if desired. In an exemplary embodiment, the contactless device 510 accepts the secure communication channel request from the POS data collector 105, and a communication channel is established. During this process, the contactless device 510 and the POS data collector may establish a relationship by creating an encryption key for use in encrypting communications therebetween. In an exemplary embodiment, the POS data collector 105 and the contactless device 510 can use any number of protocols to enable a secure or unsecure communication channel, including but not limited to Bluetooth protocols such as a link management protocol (LMP), logical link control and adaptation protocol (L2CAP), and service discovery protocol (SDP). In an exemplary embodiment, Bluetooth pairing of the POS data collector 105 and the contactless device 510 can occur automatically by such communication. In another exemplary embodiment, the contactless device 510 may present the user with an interface requesting authorization to successfully pair the contactless device 510 and the POS data collector 105 to enable a Bluetooth communication. Such Bluetooth communications include secure communication functionality.

In another exemplary embodiment, the POS data collector 105 may present a Wi-Fi connection to which the contactless device 510 can connect, which connection can occur automatically or via user authorization as described previously with regard to the Bluetooth embodiment. A Wi-Fi connection can comprise secure communication functionality, such as cryptographic protocols, including transport layer security or secure socket layer protocols, or other secure communication methodology.

In an alternative exemplary embodiment, the POS data collector 105 may present a near field communication ("NFC") connection to the contactless device 510 to communicate via NFC protocols.

In an exemplary embodiment, the transceiver 372 of the POS data collector 105 detects the physical proximity of the contactless device 510. The POS data collector 105 and the contactless device 510 may initially interact via NFC protocols whereby the data collector 105 detects the presence of the device 510 and requests communication therewith. After initial interaction via an NFC protocol, the POS data collector 105 and the contactless device 510 can establish a secondary communication channel via a different communication protocol, such as Bluetooth or Wi-Fi. In an alternative exemplary embodiment, the POS data collector 105 initiates a timing protocol with the contactless device 510. The timing protocol ensures communication with a single device and detects additional time that would be required to communicate through a proxy device, thereby determining whether the contactless device 510 is physically present at the POS data collector 105. In another exemplary embodiment, the timing protocol can establish a period of inactivity that will terminate the communication between the contactless device 510 and the data collector 105 once a secure communication channel is established.

In block 650, the POS data collector 105 identifies the contactless device 510 and its user based on information provided by the contactless device 510. In an exemplary embodiment, the contactless device 510 transmits user identification information to the POS data collector 105. The user identification information may be used to identify a user account stored in the remote system 150. In exemplary embodiments, the user identification information can comprise one or more of name, account number, other personal identifier, device identifier, login, address, phone number, or other suitable information that identifies the contactless device 510, the user, and/or the user's account at the remote system 150.

The POS data collector 105 identifies the offers to apply to the purchase, in block 660, based on the information received in block 650. The method for identifying offers to apply to the purchase is described in more detail hereinafter with reference to the methods in FIGS. 7-8.

Figure 7:
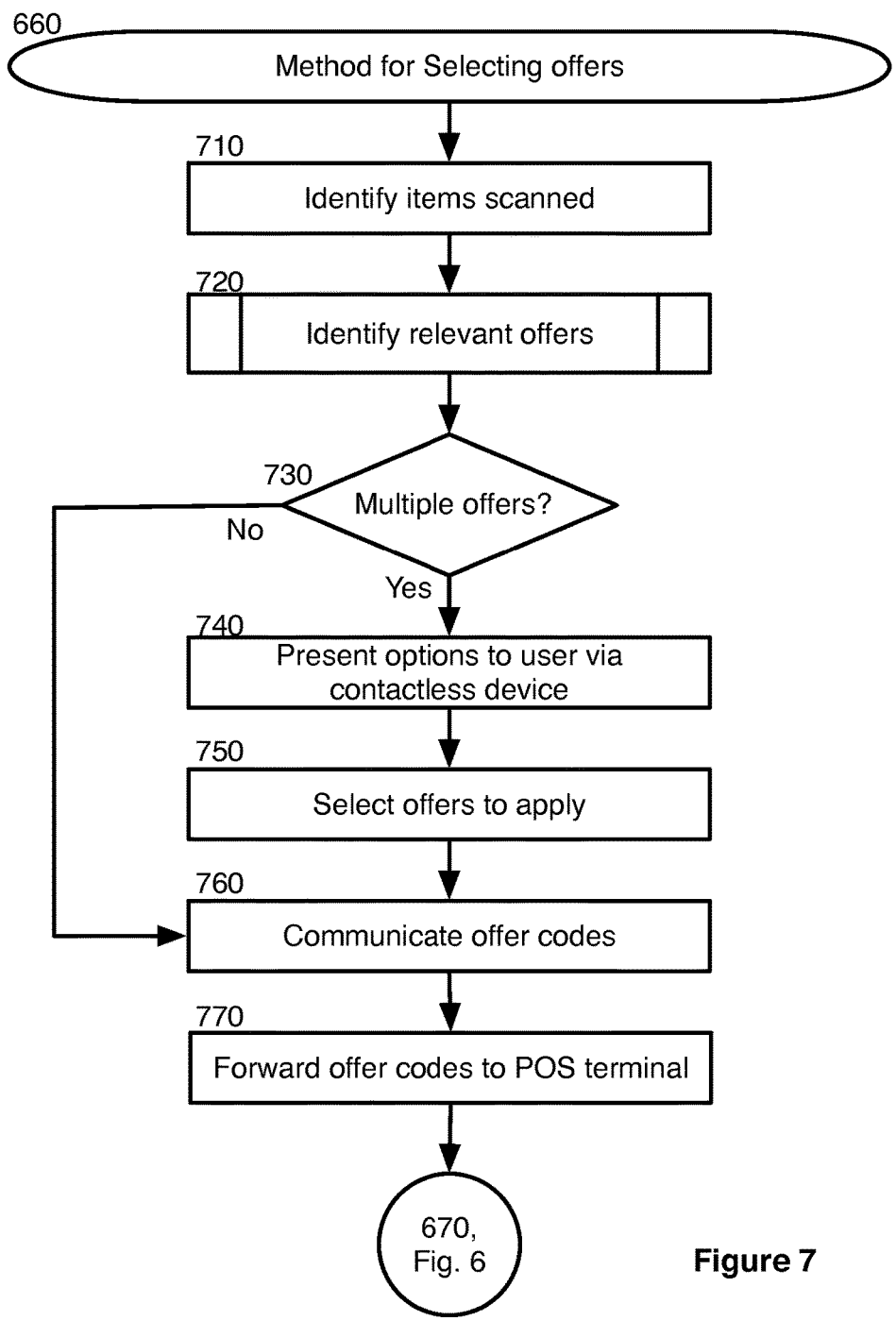
FIG. 7 is a block flow diagram depicting a method for selecting coupons, in accordance with exemplary embodiments.

FIG. 7 is a block flow diagram depicting a method 660 for selecting offers, in accordance with exemplary embodiments. The method 660 is described with reference to the components illustrated in FIG. 5.

In an exemplary embodiment, the method 660 may be performed at any time during or after the transaction. For example, offers may be applied before the conclusion of the transaction, wherein the value of the offers is deducted from the total cost of the transaction. In an alternative exemplary embodiment, the offers may be applied after the transaction is completed. For example, the user may pay the total cost of the transaction and receive a rebate or redemption for the value of the offers.

In block 710, the POS data collector 105 identifies the items scanned by the merchant. In an exemplary embodiment, the POS data collector 105 recalls from the storage 362 the product identifier associated with each product that was scanned by the POS scanner 110 or 212 (for example, the bar code information received).

The POS data collector 105 identifies the relevant offers, in block 720. The method 720 for identifying the relevant offers is described in more detail hereinafter with reference to the methods of FIG. 8.

Figure 8:
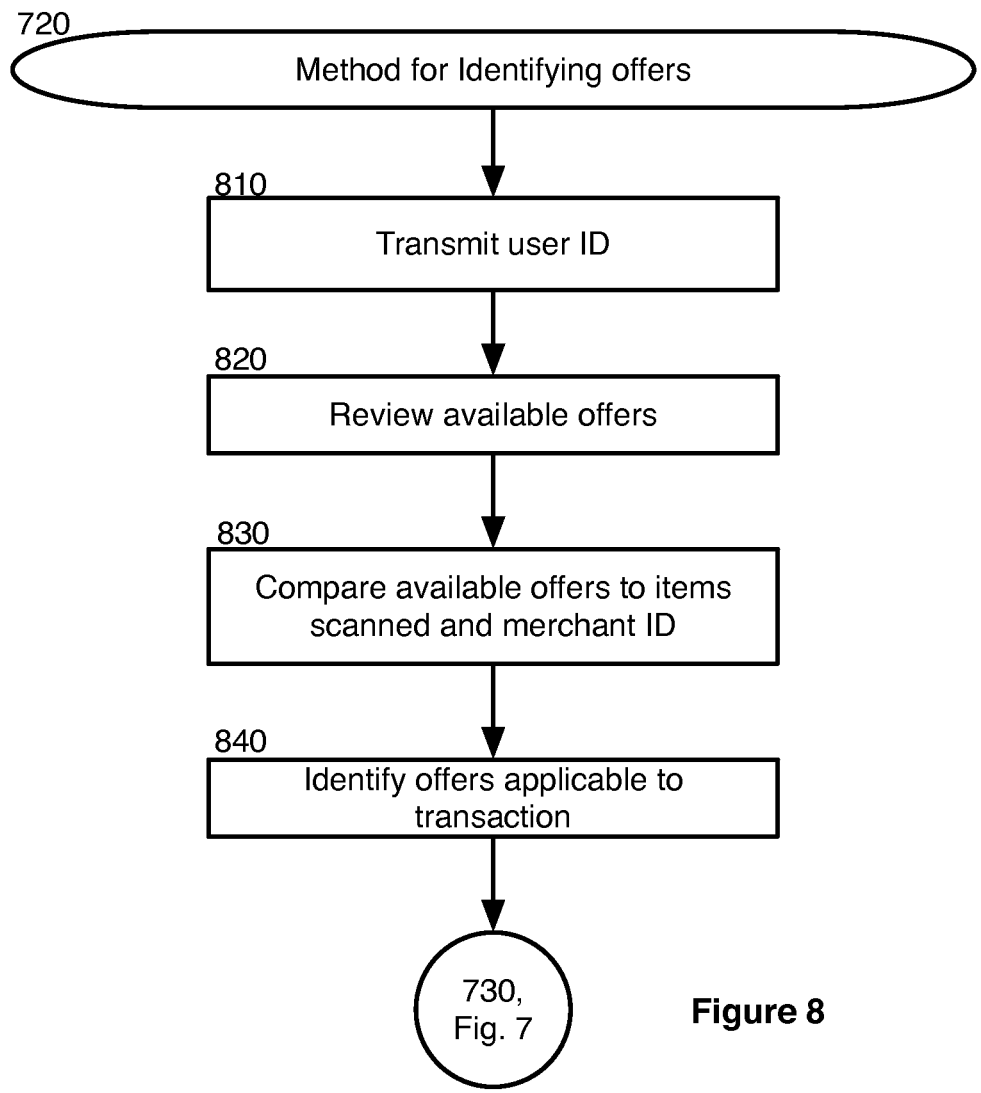
FIG. 8 is block flow diagram depicting a method for identifying coupons, in accordance with exemplary embodiments.

FIG. 8 is a block flow diagram depicting a method 720 for identifying offers, in accordance with exemplary embodiments. The method 720 is described with reference to the components illustrated in FIG. 5.

In block 810, the POS data collector 105 transmits one or more of the user identification received from the contactless device 510 in block 650, merchant identification information obtained from the POS terminal 115 or stored in the memory 362, and the product information stored in the memory 362 to the remote system 150. As previously described, the user identification information may be used to identify the user account stored in the remote system 150. The user account at the remote system 150 may have stored therein offers previously collected by the user or available to the user for use in a purchase transaction.

In an alternative exemplary embodiment, the POS data scanner 105 communicates directly with the contactless device 510 without the remote system 150. The POS data collector 105 may transmit one or more of the merchant identification information obtained from the POS terminal 115 or stored in the memory 362 and the product information stored in the memory 362 to the contactless device 510 to enable access to the available offers previously collected by the user or available to the user for use in a purchase transaction and stored in the contactless device 510.

In another exemplary embodiment, the POS data collector 105 can transmit the GPS coordinates to the contactless device 510 or the remote system 150 to enable identification of the merchant via location and to access to the available offers stored in the contactless device 510 or the remote system 150. In an alternative exemplary embodiment, the contactless device 510 accesses internal GPS coordinates generated within the contactless device 510 to identify the merchant via location.

The POS data collector 105, the remote system 150, and/or the digital wallet application 520 of the contactless device 510 accesses and reviews the available offers, other value-added services, or other items available for use in the purchase transaction, in block 820. In an exemplary embodiment, the POS data collector 105 communicates with the remote system 150 to access the available items. In an alternative exemplary embodiment, the POS data collector communicates with the contactless device 510 to access the available items. In an exemplary embodiment, offers may include, but are not limited to, coupons, prepaid offers, redemptions, rebates, discount codes, discounts, loyalty rewards, points, and other forms for value added services.

In block 830, the POS data collector 105, the remote system 150, and/or the digital wallet application 520, as appropriate, compares the available items with the product identification information (for example, the product bar code information). In an exemplary embodiment, these components also compare the available merchant offers to the merchant identification information.

The POS data collector 105 then identifies offers applicable to the transaction, in block 840. For example, based on the comparison conducted in block 830, a match between an offer (such as a coupon, prepaid offer, value-added service, or other offer) and the product identification information for a product means the matching offer is applicable to the transaction. Additionally, based on the comparison conducted in block 830, a match between an offer (such as a coupon, prepaid offer, value-added service, or other offer) and the merchant identification information for the merchant means the matching offer is applicable to the transaction.

From block 840, the method 660 proceeds to block 730 (FIG. 7).

Returning to FIG. 7, in block 730, the POS data collector 105 determines whether multiple offers are available for the transaction. For example, multiple offers may be available for a single product, such as a specified amount or a specified percentage off the cost of the product; multiple offers may be available for a transaction conducted with the merchant, for example, a specified amount off the purchase of multiple products or a specified amount or percentage reduction if the purchase price exceeds a specified amount; multiple loyalty redemptions may be available if the user has earned separate loyalty rewards, or other offer choices may be applicable.

If multiple offers are applicable, the POS data collector 105 presents the available options to the user via the contactless device 510, in block 740. In an exemplary embodiment, the user is presented with the options via user interface 515 of the contactless device 510. In an exemplary embodiment, the user interface 515 presents the options as a pop-up window prompting action by the user. In an alternative exemplary embodiment, an application 520 is initiated prompting action by the user.

In an exemplary embodiment, the remote system 150, the data collector 105, or the digital wallet application 520 of the contactless device 510 can determine the best value use of multiple offers and can automatically apply the best value of multiple offers to the purchase based on the redemption rules for each offer. For example, the appropriate component can apply all offers having redemption rules met by the purchase transaction. If multiple offers apply but cannot be used together, the appropriate component can determine which offer results in the best value to the user and can apply that offer.

In block 750, in the case where the user is provided an opportunity to select one of multiple offers to apply to the transaction, the user selects the offer(s) to apply to the purchase. In an exemplary embodiment, the user utilizes a touch screen, keyboard, trackball, track pad, or other input device of the contactless device 510 to select the offers to apply to the purchase.

In block 750, the user's input is then processed by the requesting component. For example, the digital wallet application 520 of the contactless device 510 can receive the user's input and can use the user's input to identify and apply the appropriate offers to the transaction. Alternatively, the digital wallet application 520 of the contactless device 510 can receive the user's input and can forward the user's input to the POS data collector 105 to identify and apply the appropriate offers to the transaction.

In block 760, the POS data collector 105 reads the offer code or other identifier associated with each applicable and/or selected offer to be applied to the transaction.

In an exemplary embodiment, the POS data collector 105 receives the offer codes from the remote system 150. In an alternative exemplary embodiment, the POS data collector 105 receives the offer codes from the contactless device 510.

Referring back to block 730, if multiple offers do not apply to the transaction or if user input is not needed to select applicable offers, the method 660 can proceed from block 730 directly to block 760.

The POS data collector 105 transmits the offer codes to the POS terminal 115, in block 770.

From block 770, the method 660 proceeds to block 670 (FIG. 6).

Returning to FIG. 6, in block 670, the POS terminal 115 redeems the offers received from the POS data collector 105. In an exemplary embodiment, the POS terminal 115 processes the offer codes received from the POS data collector to apply the offers to the transaction.

In an exemplary embodiment, the block 670 may be performed at any time during or after the transaction. For example, offers may be applied before the conclusion of the transaction, wherein the value of the offers is deducted from the total cost of the transaction. In an alternative exemplary embodiment, the offers may be applied after the transaction is completed. For example, the user may pay the total cost of the transaction and receive a rebate or redemption for the value of the offers. In this embodiment, a redemption may be credited to any financial account designated by the user. For example, the redemption may be credited to the same financial account as used by the user to make the purchase or to a different financial account than used in the transaction. Alternatively, the redemption may be split between one or more financial accounts. For example, the redemption may be split between the financial account used to make the purchase and a different financial account, or between multiple different financial accounts.

In block 680, the communication channel between the contactless device 510 and the POS data collector 105 is terminated. In an exemplary embodiment, the original connection can be terminated when the request is communicated after block 640, or any suitable time thereafter.

General

Users may be allowed to limit or otherwise affect the operation of the features disclosed herein. For example, users may be given opportunities to opt-in or opt-out of the collection or use of certain data or the activation of certain features. In addition, users may be given the opportunity to change the manner in which the features are employed, including for situations in which users may have concerns regarding privacy. Instructions also may be provided to users to notify them regarding policies about the use of information, including personally identifiable information, and manners in which each user may affect such use of information. Thus, information can be used to benefit a user, if desired, through receipt of relevant advertisements, offers, or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer.

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method to provide point of sale processing of offers via communication of a contactless device with a point of sale data collector, comprising:
    scanning, by a point of sale scanner, one or more items for a purchase transaction to capture product identification information for each item;
    receiving, by a point of sale data collector from the point of sale scanner, the product identification information for each item;
    forwarding, by the point of sale data collector, the received product identification information to a point of sale terminal;
    detecting, by the point of sale data collector, a mobile communication device in proximity to the point of sale data collector;
    establishing, by the point of sale data collector, a first communication channel between the mobile communication device and the point of sale data collector;
    receiving, by the point of sale data collector via the first communication channel with the mobile communication device, identifying information for a user of the mobile communication device;
    establishing, by the point of sale data collector, a second communication channel between a remote server and the point of sale data collector;
    communicating, by the point of sale data collector, the identifying information for the user, the product identification information, and information identifying a merchant that is a party to the transaction to the remote server via the second communication channel;
    identifying, by the remote server, one or more offers to apply to the purchase transaction based on at least one of the identifying information for the user, the product identification information, and the information identifying the merchant that is a party to the transaction, each of the one or more offers comprising a redemption code;
    receiving, by the point of sale data collector, one or more offers that were identified by the remote server to apply to the purchase transaction;
    displaying, by the point of sale data collector, the one or more offers to the user via a user interface of the contactless device for selection by the user of an offer to be redeemed in connection with the transaction by user input on the user interface;
    receiving, by the point of sale data collector, the user input via the user interface selecting the offer to be redeemed;
    transmitting, by the point of sale data collector, the redemption code for the selected offer to the point of sale terminal; and
    redeeming, by the point of sale terminal, the selected offer based on the received redemption code.

2. A computer-implemented method to provide point of sale processing of offers via communication of a contactless device with a computer, comprising:
    receiving, by a computer, product identification information for each item in a purchase transaction;
    communicating, by the computer, the received product identification information to a point of sale terminal;
    detecting, by the computer, a mobile communication device in proximity to the computer;
    establishing, by the computer, a first communication channel between the mobile communication device and the computer;
    receiving, by the computer via the communication channel with the mobile communication device, identifying information for a user of the mobile communication device;
    establishing, by the computer, a second communication channel between a remote computer and the computer;
    communicating, by the computer, the identifying information for the user, the product identification information, and information identifying a merchant that is a party to the transaction to the remote computer via the second communication channel;
    identifying, by the remote computer, offers available to the user of the mobile communications device;
    comparing, by the remote computer, the available offers to the product identification information and the information identifying the merchant to determine which offers comprise redemption rules that are met by the transaction;
    selecting, by the remote computer, the offers to apply based on the offers that have redemption rules that are met by the transaction; and
    communicating, by the remote computer, the one or more offers to apply to the purchase transaction.

3. The method of claim 2, wherein the first communication channel is established using at least one of near field communication (NFC), Bluetooth communication, or Wi-Fi communication.

4. The method of claim 2, wherein the product identification information for each item in the transaction is obtained from a corresponding machine-readable identifier on each respective item.

5. The method of claim 2, wherein the one or more offers comprise at least one of a product coupon, a merchant coupon, and a loyalty reward.

6. A computer program product, comprising:
    a non-transitory computer-readable storage device having computer-executable program instructions embodied thereon that when executed by a computer cause the computer to provide point of sale processing of offers, the computer-executable program instructions comprising:
    computer-executable program instructions to intercept, between a machine-readable identifier capture device and a transaction processing device, product identification information for an item in a purchase transaction;
    computer-executable program instructions to receive, from a mobile communication device, information associated with a plurality of stored offers;
    computer-executable program instructions to read the product identification information for the item in the transaction and information identifying a merchant that is a party to the transaction;

computer-executable program instructions to identify the plurality of stored offers based on the information associated with the plurality of stored offers;

computer-executable program instructions to compare the stored offers to the product identification information and the information identifying the merchant to determine which offers comprise redemption rules that are met by the transaction;

computer-executable program instructions to select the offer to apply based on which offers have redemption rules that are met by the transaction; and computer-executable program instructions to transmit the redemption information to the transaction processing device.

7. The computer program product of claim 6, further comprising computer-executable program instructions to establish and to terminate a communication channel with the mobile communication device.

8. The computer program product of claim 7, wherein the communication channel is established using at least one of a near field communication (NFC) protocol, a Bluetooth communication protocol, and a Wi-Fi communication protocol.

9. The computer program product of claim 6, wherein the product identification information for the item in the transaction is obtained from a machine-readable identifier on the item.

10. The computer program product of claim 6, wherein the plurality of stored offers comprises at least one of a product coupon, a merchant coupon, and a loyalty reward.

11. The computer program product of claim 6, further comprising computer-executable program instructions to receive an input of a selection identifying a particular one of the offers to be redeemed in connection with the transaction.

12. The computer program product of claim 6, wherein the computer-executable program instructions to identify one of the stored offers having redemption rules satisfied by the transaction comprises:

computer-readable program code to communicate, to a remote computer, the product identification information for the item in the transaction, information identifying a merchant that is a party to the transaction, and the information associated with the plurality of stored offers; and computer-readable program code to receive, from the remote computer, the one of the stored offers having redemption rules satisfied by the transaction.

13. The computer program product of claim 6, wherein the computer-executable program instructions to identify one of the stored offers having redemption rules satisfied by the transaction comprises:

computer-executable program instructions to communicate, to the mobile communication device, the product identification information for the item in the transaction, information identifying a merchant that is a party to the transaction, and the information associated with the plurality of stored offers; and computer-executable program instructions to receive, from the mobile communication device, the one of the stored offers having redemption rules satisfied by the transaction.

14. A system to provide point of sale processing of offer, comprising:

a data collecting device configured to:
intercept, between a machine-readable identifier capture device and a transaction processing device, product identification information for each of a plurality of items in a purchase transaction, forward the product identification information to the transaction processing device;

establish a communication first channel with a mobile communication device;

receive, from the mobile communication device, information associated with a plurality of stored offers via the first communication channel, and communicate the product identification information for each of the items in the transaction, information identifying a merchant that is a party to the transaction, and the information associated with the stored offers; and a remote computer configured to:
receive, from the data collecting device, the product identification information for each of the items in the transaction, the information identifying the merchant that is a party to the transaction, and the information associated with the stored offers via a second communication channel established by the data collecting device between the data collecting device and the remote computer;

identify the stored offers based on the information associated with the stored offers;

identify at least one of the stored offers having redemption rules satisfied by the transaction based on the product identification information for each of the items in the transaction and the information identifying the merchant that is a party to the transaction;

communicate, to the data collecting device, redemption information for each of the stored offers having redemption rules satisfied by the transaction;

wherein the redemption information communicated to the transaction processing device comprises redemption information for the particular one of the plurality of offers having redemption rules satisfied by the transaction; and wherein the data collecting device is further configured to communicate the redemption information to the transaction processing device for redemption in connection with the transaction.

15. The system of claim 14, wherein the information associated with the stored offers comprises information identifying an account of a user of the mobile communication device, the account operated by the remote computer and having the stored offers associated therewith.

16. The system of claim 14, wherein the data collecting device is configured to receive, from the mobile communication device, the information associated with the stored offers via a near field communication channel established with the mobile communication device.

17. The system of claim 14, wherein the data collecting device is configured to receive, from the mobile communication device, the information associated with the stored offers via a Bluetooth or Wi-Fi communication channel established with the mobile communication device.

18. The system of claim 14, wherein the product identification information for each of the items in the transaction is obtained from a machine-readable identifier on each respective one of the items.

19. The system of claim 14, wherein the plurality of stored offers comprises at least one of a product coupon, a merchant coupon, and a loyalty reward.

20. A computer-implemented method to provide point of sale processing of offers via communication of a contactless device with a computer, comprising:

receiving, by a computer, identifying information for a user of a mobile communications device, product identification information for each of a plurality of items in a purchase transaction, and information identifying a merchant that is a party to the purchase transaction, the product identification information having been intercepted between a machine-readable identifier capture device and a transaction processing device during the purchase transaction;

identifying, by the computer, offers available to the user of the mobile communications device;

comparing, by the computer, the available offers to the product identification information and the information identifying the merchant to determine which offers comprise redemption rules that are met by the transaction;

selecting, by the computer, the offers to apply based on the offers that have redemption rules that are met by the transaction; and communicating, by the remote computer, the one or more offers to apply to the purchase transaction.

\* \* \* \* \*